(12) United States Patent
Koren

(10) Patent No.: US 6,393,192 B1
(45) Date of Patent: May 21, 2002

(54) ILLUMINATED WATER FEATURE

(75) Inventor: Pinhas Paul Koren, Altamonte Springs, FL (US)

(73) Assignee: Oasis Waterfalls LLC, Orlando, FL (US)

( * ) Notice: Subject to any disclaimer, the term of this patent is extended or adjusted under 35 U.S.C. 154(b) by 13 days.

(21) Appl. No.: 09/630,489

(22) Filed: Aug. 2, 2000

Related U.S. Application Data

(60) Provisional application No. 60/190,432, filed on Mar. 17, 2000.

(51) Int. Cl.[7] .................................................. G02B 6/00
(52) U.S. Cl. ................. 385/147; 385/901; 362/559; 362/562; 362/565; 239/18; 239/12
(58) Field of Search ................................. 385/147, 901; 362/562, 565, 559; 239/12, 18

(56) References Cited

U.S. PATENT DOCUMENTS

| | | | |
|---|---|---|---|
| 4,749,126 A | | 6/1988 | Kessener et al. |
| 4,901,922 A | * | 2/1990 | Kessener ..................... 239/12 |
| 5,207,499 A | | 5/1993 | Vajda et al. |
| 5,680,496 A | | 10/1997 | Burkitt, III et al. |
| 5,825,954 A | | 10/1998 | Dunn et al. |
| 5,980,076 A | | 11/1999 | Dunn et al. |
| 6,030,108 A | * | 2/2000 | Ishiharada .................. 362/562 |

FOREIGN PATENT DOCUMENTS

EP    WO 87/04230    *    7/1987

* cited by examiner

*Primary Examiner*—Cassandra Spyrou
*Assistant Examiner*—Leo Boutsikaris
(74) *Attorney, Agent, or Firm*—Beusse Brownlee Bowdoin & Wolter, P.A.; David G. Maire

(57) ABSTRACT

A water feature provided with both water and an illuminating optical fiber through a single tube. The tube is sealingly connected to a housing having separate inlets for water and the fiber optic cable. A fitting connected between the tubing and the housing allows water to flow through the annulus between the fiber outside diameter and the tubing inside diameter. Water provided to the fitting from a water source passes through the tubing into a fixture where it then exits to form a waterfall or other water display. Light emitted from an end of the fiber optic cable illuminates the water display. By using a transparent or translucent tube, light emitted from along the length of the cable may be used to illuminate the translucent fixture itself.

16 Claims, 2 Drawing Sheets

ILLUMINATED WATER FEATURE

This application claims the benefit of the Mar. 17, 2000, filing date of U.S. provisional patent application serial No. 60/190,432.

BACKGROUND OF THE INVENTION

The present invention relates generally to the field of fiber optics, and more particularly to a water feature apparatus illuminated by a fiber optic cable, and specifically to an apparatus for connecting both a water supply and an optical light fiber to a water feature.

It is known to utilize fiber optic lighting techniques to illuminate structures and areas near a pool or a spa. The absence of electrical power and heat associated with a fiber optic cable makes it an ideal light source for use near such recreational water structures. It is also known to illuminate water features associated with a pool or spa. The term "water feature" as used herein is meant to include any structure having an outlet for discharging water to form a pleasing aesthetic effect. A water feature may include, for example, a spout, a statuette, a waterfall, a figurine, a water outlet fitting or other such object. Water features are typically utilized in a recirculation mode wherein the water expelled from the water feature is collected in the pool or spa and then recycled repeatedly there through.

Lighting may be directed onto a water feature from a remote light source, such as a spotlight, or it may be directed from within the water feature, such as by embedding a fiber optic cable within the water feature. When the water feature is supported on a wall or other such structure, two separate penetrations through the structure are needed, one for the water supply line and one for the fiber optic cable. For example, a lion's head water feature may be designed to be supported against a bond beam wall located along the side of a pool or spa. The location and number of connections for the water supply and the fiber optic cable are dictated by the design of the water feature. A contractor constructing the bond beam must be aware of the exact spacing required by the specific water feature in order to correctly provide access openings through the wall for later insertion of the water and fiber optic supply lines. Such prior knowledge and expert craftsmanship is a rare combination. As a result, many installations of water features involve the drilling of a plurality of holes through an existing bond beam structure.

U.S. Pat. No. 5,207,499 issued to Vajda, et. al, describes an integral light and liquid circulation fitting. This fitting provides both light and water through a single hole in the wall of a pool or spa. However, the fitting of Vajda requires water and air cooling if it is installed underwater, and it has limited decorative appeal.

BRIEF SUMMARY OF THE INVENTION

Thus, there is a particular need for an illuminated water feature that is easily installed can be connected to both water and light supplies through a single opening, and has the flexibility to be used in a variety of decorative applications. Accordingly, a water feature is described herein having: a housing having a generally hollow interior and having at least three openings formed therein; a water conduit sealingly connected to a first of the housing openings; a water supply connected to the water conduit and operable to deliver a flow of water into the housing interior; an optical fiber having an input end and having a portion extending into a second of the housing openings, through a portion of the housing interior, and out of a third of the housing openings, the optical fiber terminating at an output end extending beyond the third of the housing openings; a source of light disposed proximate the input end of the optical fiber; a first fitting sealingly connected between the housing and the optical fiber proximate the second of the housing openings, the first fitting operable to prevent water from flowing through the second of the housing openings; a tube disposed around the optical fiber proximate the third of the housing openings and extending therefrom toward the output end; a second fitting sealingly connected between the housing and the tube proximate the third of the housing openings, the second fitting operable to direct a flow of water from the interior of the housing into the tube around the optical fiber; and a fixture having an inlet opening and an outlet opening formed therein, the tube and optical fiber output end extending into the inlet opening.

BRIEF DESCRIPTION OF THE DRAWINGS

The features and advantages of the present invention will become apparent from the following detailed description of the invention when read with the accompanying drawings in which.

Like components illustrated in more than one figure are numbered consistently among the various figures.

DETAILED DESCRIPTION OF THE INVENTION

Figure 1:
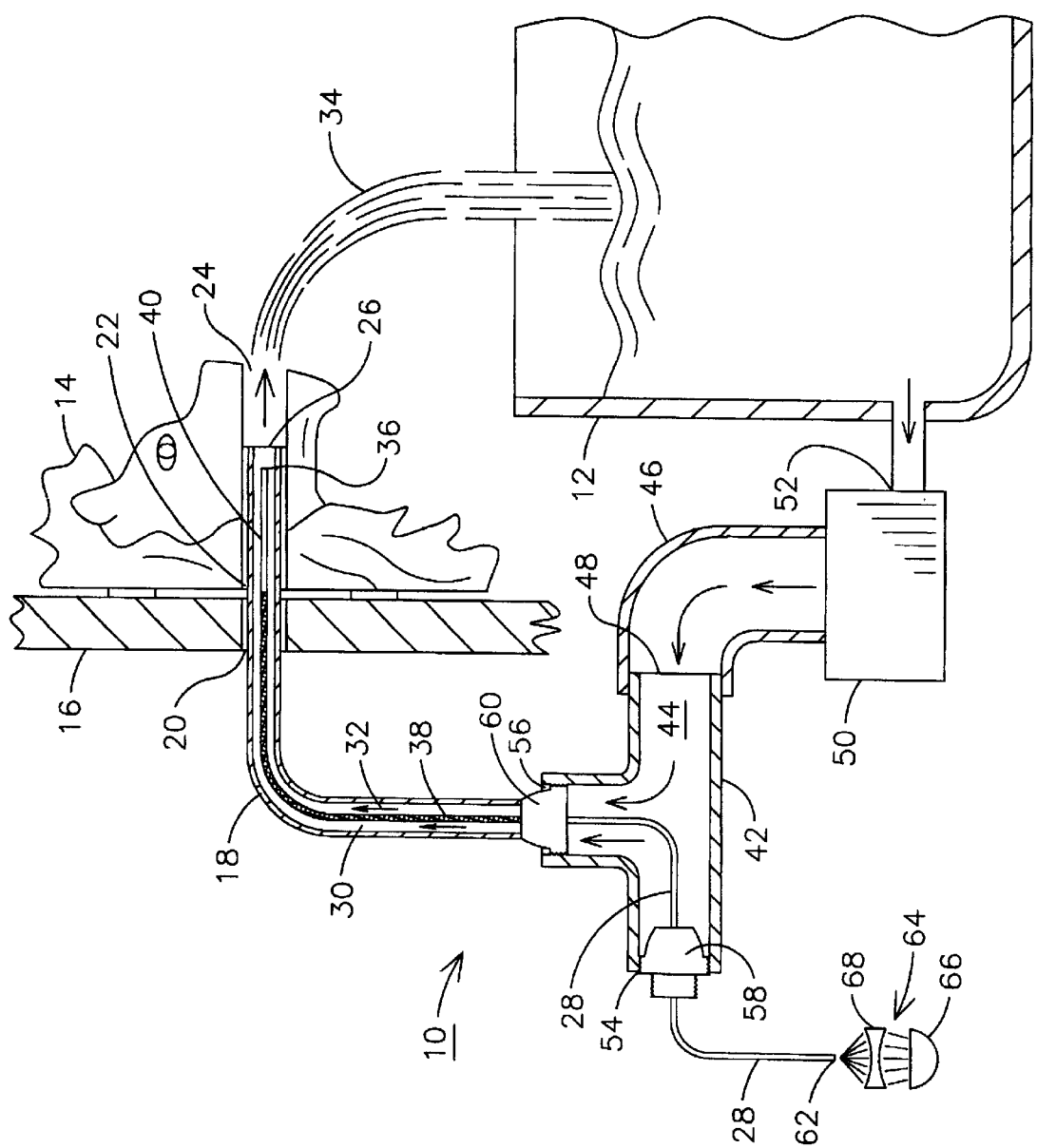
FIG. 1 is a schematic illustration of a water feature supplied by both water and light through a single tube connected to a housing having connections to both a water supply and a fiber optic light source.

FIG. 1 illustrates a water feature 10 associated with a recreational water device such as a pool or spa 12. An ornamental fixture 14, illustrated as having the shape of an animal head, is attached to a bond beam wall 16 located proximate to the pool or spa 12. A tube 18 passes through a single hole 20 formed in the wall 16 and into an inlet opening 22 of the fixture 14. An outlet opening 24 is formed in the fixture 14 and is in fluid communication with an end 26 of tube 18. The tube 18 is selected to have an inside diameter measuring somewhat greater than the outside diameter of a fiber optic cable 28 disposed therein. Tube 18 may be made of any material known in the art to be compatible with the water or other fluid passing there through, and is preferably transparent or translucent. The annulus between the outside diameter of the fiber optic cable 28 and the inside diameter of the tube 18 defines a passageway 30 for the flow of water 32 or other fluid to form waterfall 34. Fixture 14 may be formed of any material known in the art, but may preferably be formed of a translucent or transparent material such as plastic. Light energy conducted through fiber optic cable 28 may be projected from an output end 36 of the cable 28 in order to eliminate waterfall 34 and the surrounding area. In the embodiment illustrated in the Figure, fiber optic 28 has a reflective coating 38 disposed on its outer surface along its entire length, but not near the output end 36. Thus, there exists a side-emitting portion 40 of fiber optic cable 28 disposed within the fixture 14. Light emanating from this side-emitting portion 14 provides illumination for the interior of the translucent material of fixture 14. In this manner, a single fiber optic cable 28 provides illumination for both a water fixture 14 and for the waterfall 34 and surrounding area proximate the fixture 14.

In order to provide both light and water to the water fixture 14 through a single inlet opening 22, a housing 42 having a generally hollow interior 44 is provided. A water conduit 46 is sealingly connected to a first 48 housing opening in order to deliver a flow of water into the housing interior 44 from a source of water 50. The source of water 50 is illustrated in the Figure as being a pump having an inlet 52 connected to the pool or spa 12. In this manner water may be recirculated through the water feature 10 on a continuous basis. The fiber optic cable 28 extends into a second 54 housing opening and through a portion of the housing interior 44. The cable 28 extends out of the housing 42 through a third 56 housing opening. The second and third housing openings 54, 56 are sealed by a first and second fitting 58, 60 respectively. First fitting 58 may be a compression style fitting connected between the housing 42 and the optical fiber 28 at a location proximate the second 54 of the housing openings. The first fitting 58 is operable to prevent water from flowing through the second opening 54. The fitting 58 may be glued, threaded, or otherwise sealingly attached to the housing 42. Similarly, the second fitting 60 is sealingly connected between the housing 42 and the tube 18 at a location proximate the third 56 of the housing openings. Fitting 60 may also be a compression fitting that is glued, threaded or otherwise sealingly attached to the housing 42. The second fitting 60 is operable to direct the flow of water from the source of water 50 through the interior 44 of the housing 42 and into the annular passageway 30 around the optical fiber 28. In this manner, housing 42 and fittings 58, 60 function to provide both water and light to a water fixture 14 through a single tube 18 containing a fiber optic cable 28. The input end 62 of the optical fiber 28 is disposed proximate a light source 64, such as lamp 66 and lens 68.

It may be appreciated that housing 42 may be embodied in other shapes. Importantly, a fitting 60 is provided at an outlet opening of the housing 42 in order to provide a watertight seal around tube 18 containing fiber optic cable 28. An alternative embodiment of housing 42 may have a generally "Y" shape, or it may be configured as a straight tube having openings on opposed ends and an opening formed through the wall of the tube. Alternatively, housing 42 may have only one inlet and one outlet opening, with appropriate fittings providing for the separate introduction of water and a fiber optic cable into the housing, and the passage of a tube 18 containing the fiber optic cable and an annular passageway out of the housing.

Figure 2:
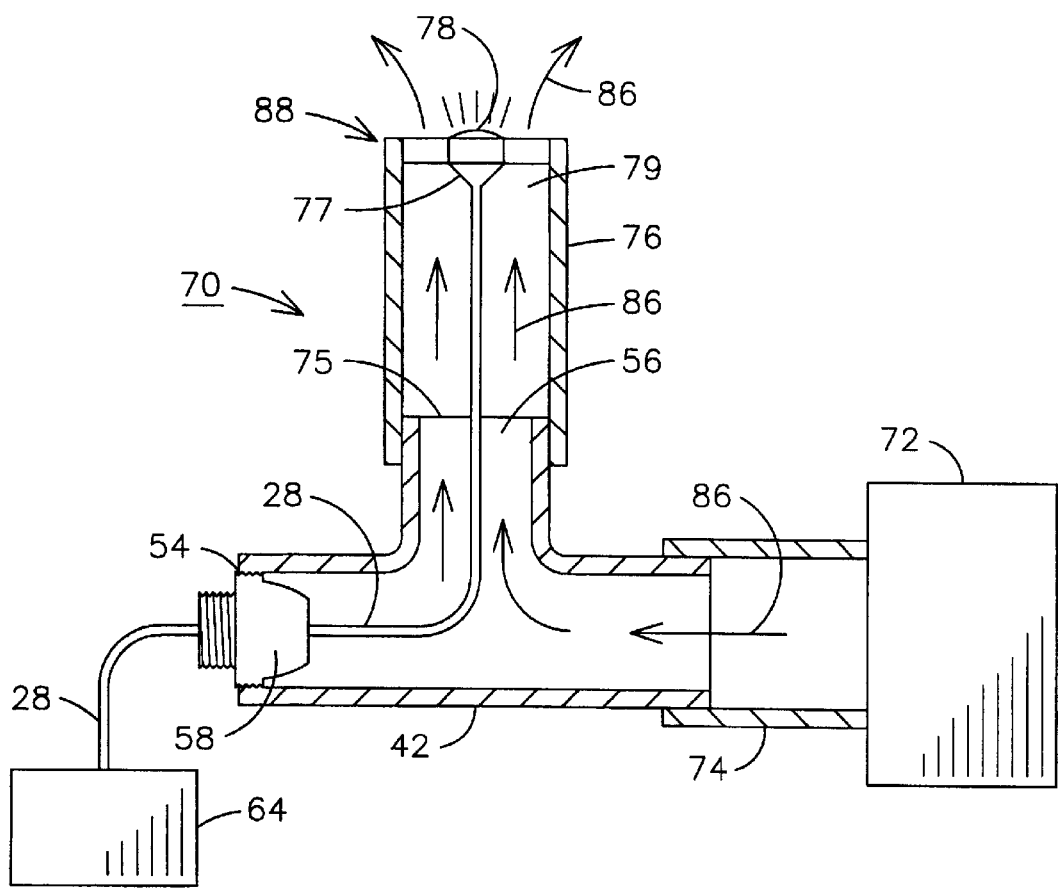
FIG. 2 a side sectional view of a water fitting supplied by both water and light through a single pipe connected to a housing having connections to both a water supply and a fiber optic light source.
Figure 3:
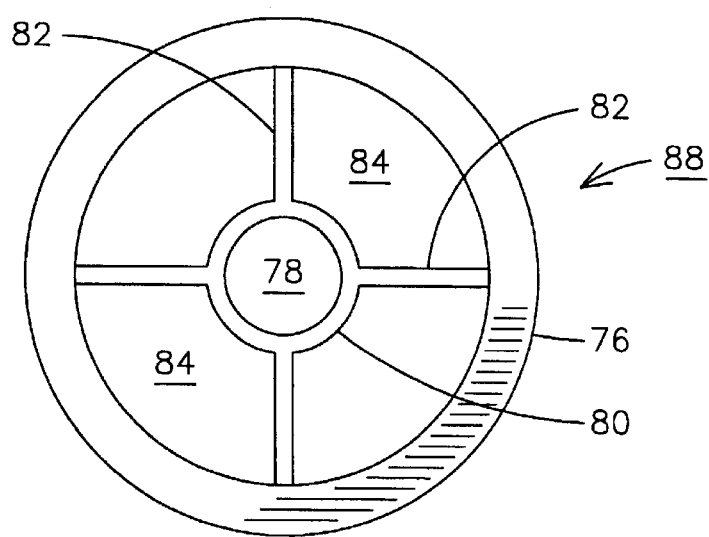
FIG. 3 is a side elevation view of the outlet end of the water fitting of FIG. 2.

FIGS. 2 and 3 illustrate another embodiment of this invention wherein a water feature 70 includes a housing physically 42 connected to a source of water 72 via pipe 74 and operatively connected to a source of light 64 via fiber optic cable 28. The fiber optic cable 28 passes into housing 42 through opening 54 and fitting 58 which provides a water-tight seal therebetween. Fiber optic cable 28 passes out of housing 42 through opening 56 and into the inlet end 75 a conduit such as tube or pipe 76, where it terminates at its output end 77 proximate lens 78 located within the outlet end 79 of conduit 76. In one embodiment the conduit 76 is a PVC pipe. As can be seen more clearly in FIG. 3, lens 78 and the output end 77 of fiber optic cable 28 are supported within conduit 76 by bracket 80. Bracket 80 includes a plurality of arms 82 defining a respective plurality of openings 84 around lens 78 through which water 86 may flow.

The outlet end 79 of conduit 76, bracket 80 and lens 78 constitute a water fitting 88 that may be installed in or proximate a pool or spa to provide a lighted water feature effect. Water provided by the source of water 72 flows through pipe 74 and housing 42 into conduit 76 to exit outlet end 79 via openings 84. Light generated by the source of light 64 is transmitted through fiber optic cable 28 to its output end 77 and through lens 78 where it exits to illuminate the flow of water 86 and the surrounding area. The water fitting 88 may optionally be used without a lens 78, with the light being provided to the surrounding area directly from the output end 77 of fiber optic cable 28. Fiber optic cable 28 may include a plurality of individual fibers or it may be a single cable.

The water feature 10, 70 of the present invention may be provided as a complete unit for the initial fabrication of a pool or spa 12. Alternatively, a kit may be provided containing the housing 42 fittings 58, 60, and tube 18 or pipe 76 along with fiber optic cable 28. Such a kit may be used with a large variety of water fixtures having different ornamental shapes. Because the apparatus of the present invention requires only a single penetration into the water fixture in order to provide both water and light, the installation of such an apparatus is greatly simplified when compared to prior art devices requiring at least two separate penetrations.

While the preferred embodiments of the present invention have been shown and described herein, it will be obvious that such embodiments are provided by way of example only. Numerous various, changes and substitutions will occur to those of skill in the art without departing from the invention herein. Accordingly, it is intended that the invention be limited only by the spirit and scope of the appended claims.

I claim as my invention:

1. An apparatus for conveying water and light to a water feature, the apparatus comprising:

a housing having a generally hollow interior and having at least three openings formed therein;

a water conduit sealingly connected to a first of the housing openings, the water conduit operable to deliver a flow of water into the housing interior;

an optical fiber extending into a second of the housing openings, through a portion of the housing interior, and out of a third of the housing openings, the optical fiber terminating at an output end beyond the third of the housing openings;

a first fitting sealingly connected between the housing and the optical fiber proximate the second of the housing openings, the first fitting operable to prevent water from flowing through the second of the housing openings;

a tube disposed around the optical fiber proximate the third of the housing openings;

a second fitting sealingly connected between the housing and the tube proximate the third of the housing openings, the second fitting operable to direct a flow of water from the interior of the housing into the tube around the optical fiber.

2. The apparatus of claim 1, wherein the tube comprises a transparent material.

3. The apparatus of claim 1, further comprising a light source disposed proximate an input end of the optical fiber.

4. The apparatus of claim 1, further comprising a source of water connected to the water conduit.

5. The apparatus of claim 1, further comprising a reflective coating disposed on the outer surface of a portion of the optical fiber but not at the output end.

6. An apparatus for conveying water and light to a water feature, the apparatus comprising:
   a housing having a generally hollow interior and having at least three openings formed therein;
   a first of the housing openings adapted to be connected to a water supply for delivery of a flow of water into the housing interior;
   an optical fiber extending into a second of the housing openings, through a portion of the housing interior, and out of a third of the housing openings, the optical fiber terminating at an output end beyond the third of the housing openings;
   a first fitting sealingly connected between the housing and the optical fiber proximate the second of the housing openings, the first fitting operable to prevent water from flowing through the second of the housing openings;
   a tube disposed around the optical fiber proximate the third of the housing openings;
   a second fitting sealingly connected between the housing and the tube proximate the third of the housing openings, the second fitting adapted to direct a flow of water from the interior of the housing into the tube.

7. The apparatus of claim 6, wherein the tube comprises one of the group of a translucent material and a transparent material.

8. The apparatus of claim 6, further comprising a light source disposed proximate an input end of the optical fiber.

9. The apparatus of claim 6, further comprising a reflective coating disposed on the outer surface of a portion of the optical fiber but not at the output end.

10. A water feature comprising:
    a housing having a generally hollow interior and having at least three openings formed therein;
    a water conduit sealingly connected to a first of the housing openings;
    a water supply connected to the water conduit and operable to deliver a flow of water into the housing interior;
    an optical fiber having an input end and having a portion extending into a second of the housing openings, through a portion of the housing interior, and out of a third of the housing openings, the optical fiber terminating at an output end extending beyond the third of the housing openings;
    a source of light disposed proximate the input end of the optical fiber;
    a first fitting sealingly connected between the housing and the optical fiber proximate the second of the housing openings, the first fitting operable to prevent water from flowing through the second of the housing openings;
    a tube disposed around the optical fiber proximate the third of the housing openings and extending therefrom toward the output end;
    a second fitting sealingly connected between the housing and the tube proximate the third of the housing openings, the second fitting operable to direct a flow of water from the interior of the housing into the tube around the optical fiber;
    a fixture having an inlet opening and an outlet opening formed therein, the tube and optical fiber output end extending into the inlet opening.

11. The water feature of claim 10, further comprising a reflective coating disposed on the outer surface of a portion of the optical fiber but not at the output end.

12. The water feature of claim 10, wherein the fixture comprises one of the group of a translucent material and a transparent material and wherein the optical fiber output end comprises a side-emitting fiber.

13. The water feature of claim 10, wherein the fixture comprises an animal shape, and further comprising the outlet opening formed in a mouth portion of the animal shape.

14. A water feature comprising:
    a conduit having an inlet end and an outlet end;
    a housing in fluid communication with inlet end of the conduit, the housing further having a water inlet opening and a fiber inlet opening;
    a fiber optic cable having an input end and an output end, the fiber optic cable passing through the fiber inlet opening of the housing and into the conduit, the output end of the fiber being disposed proximate the outlet end of the conduit;
    a source of water connected to the water inlet opening of the housing and operable to flow water through the housing and the conduit to exit the outlet end of the conduit;
    a source of light associated with the input end of the fiber optic cable and operable to transmit light through the fiber optic cable and out of the output end of the fiber optic cable.

15. The water feature of claim 14, further comprising a bracket attached between the outlet end of the conduit and the output end of the fiber optic cable, the bracket further comprising an opening for the flow of water.

16. The water feature of claim 14, further comprising a lens disposed proximate the output end of the fiber optic cable.

* * * * *